United States Patent
Raskar et al.

(10) Patent No.: US 7,738,725 B2
(45) Date of Patent: Jun. 15, 2010

(54) STYLIZED RENDERING USING A MULTI-FLASH CAMERA

(75) Inventors: Ramesh Raskar, Cambridge, MA (US); Rogerio Feris, White Plains, NY (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 935 days.

(21) Appl. No.: 10/847,068

(22) Filed: May 17, 2004

(65) Prior Publication Data

US 2004/0212725 A1    Oct. 28, 2004

Related U.S. Application Data

(63) Continuation-in-part of application No. 10/392,061, filed on Mar. 19, 2003, now Pat. No. 7,295,720.

(51) Int. Cl.
*G06K 9/40* (2006.01)
*G06K 9/48* (2006.01)

(52) U.S. Cl. .................. 382/266; 382/199; 382/254

(58) Field of Classification Search .......... 382/190, 382/199, 224, 254, 256, 284, 312; 250/559.36; 345/419, 582; 348/207.1, 207.2, 239, 371, 348/578, 584; 356/613
See application file for complete search history.

(56) References Cited

U.S. PATENT DOCUMENTS

| | | | | |
|---|---|---|---|---|
| 5,325,449 A | * | 6/1994 | Burt et al. | 382/240 |
| 5,697,001 A | * | 12/1997 | Ring et al. | 396/121 |
| 5,949,901 A | * | 9/1999 | Nichani et al. | 382/149 |
| 6,088,470 A | * | 7/2000 | Camus et al. | 382/117 |
| 6,490,048 B1 | * | 12/2002 | Rudd et al. | 356/601 |
| 6,859,565 B2 | * | 2/2005 | Baron | 382/275 |
| 6,903,359 B2 | * | 6/2005 | Miller et al. | 250/559.36 |

(Continued)

FOREIGN PATENT DOCUMENTS

JP    P07-93561 A    4/1995

(Continued)

OTHER PUBLICATIONS

DeCarlo et al. ("Stylization and Abstraction of Photographs," Proc. 29th Conf. on Computer Graphics and Interactive Techniques, V. 21, Issue 3, Jul. 2002, pp. 769-776).*

(Continued)

*Primary Examiner*—Yubin Hung
(74) *Attorney, Agent, or Firm*—Dirk Brinkman; Gene Vinokur

(57) ABSTRACT

A method generates a stylized image of a scene including an object. A set of n input images are acquired of the scene with a camera. Each one of the n input images is illuminated by one of a set of n light sources mounted on a body of the camera at different positions from a center of projection of a lens of the camera. Ambient lighting can be used to illuminate one image. Features in the set of n input images are detected. The features include depth edges, intensity edges, and texture edges to determine qualitative depth relationships between the depth edges, the intensity edges and the texture edges. The set of n input images are then combined in an output image to enhance the detected features according to the qualitative relationships.

38 Claims, 13 Drawing Sheets

U.S. PATENT DOCUMENTS

| | | | |
|---|---|---|---|
| 6,919,906 B2* | 7/2005 | Hoppe et al. | 345/611 |
| 7,071,989 B2* | 7/2006 | Nakata | 348/371 |
| 7,574,067 B2* | 8/2009 | Tu et al. | 382/254 |
| 2002/0050988 A1* | 5/2002 | Petrov et al. | 345/418 |
| 2002/0118209 A1* | 8/2002 | Hylen | 345/582 |

FOREIGN PATENT DOCUMENTS

| | | |
|---|---|---|
| JP | P08-294113 A | 11/1996 |
| JP | P09-186935 A | 7/1997 |
| JP | P11-265440 A | 11/1999 |
| JP | P2001-175863 A | 6/2001 |
| JP | P2003-296736 A | 10/2003 |

OTHER PUBLICATIONS

Ganesan et al. ("Edge detection in untextured and textured images—A common computational framework," IEEE T. Systems, Man and Cybernetics—Part B: Cybernetics, V. 27, No. 5, Oct. 1997, pp. 823-834).*

Ntalianis et al. ("Tube-Embodied Gradient Vector Flow Fields for Unsupervised Video Object Plane (VOP) Segmentation," Proc. Int'l Conf. Image Processing, V. 2, Oct. 7-10, 2001, pp. 637-640).*

Raskar et al. ("Blending Multiple Views," Proceedings 10th Pacific Conf. on Computer Graphics and Applications, Oct. 9-11, 2002, pp. 145-153).*

Ma et al. ["Integration of Skin, edge and Texture to Extract Natural Gesture," SPIE V. 4875 (2nd International Conference on Image and Graphics), 2002, pp. 716-722].*

Perez-Jacome et al. ("Target detection via combination of feature-based target-measure images", SPIE vol. 3720, Apr. 1999, pp. 345-356).*

Saito, et al., "Comprehensible Rendering of 3-D Shapes," Proceedings of SIGGRAPH'90, 1990.

Markosian, et al., "Real-Time Non-photorealistic Rendering," Proceedings of SIGGRAPH'97, pp. 415-420, 1997.

Hertzmann, "Painterly Rendering with Curved Brush Strokes of Multiple Sizes," ACM SIGGRAPH, pp. 453-460, 1998.

Lin, et al., "Building detection and description from a single intensity image," Computer Vision and Image Understanding: CVIU 72, 2, pp. 101-121, 1998.

Chuang, et al., "Shadow matting and compositing," ACM Trans. Graph. 22, 3, pp. 494-500, 2003.

Toyama, et al., "Wallflower: Principles and Practice of Background Maintenance," ICCV, pp. 255-261, 1999.

Weiss, "Deriving intrinsic images from image sequences," Proceedings of ICCV, vol. 2, pp. 68-75, 2001.

Geiger, et al., "Occlusions and binocular stereo," European Conference on Computer Vision, pp. 425-433, 1992.

Intille, et al., "Disparity-space images and large occlusion stereo," ECCV (2), pp. 179-186, 1994.

Birchfield, et al., "Depth discontinuities by pixel-to-pixel stereo," International Journal of Computer Vision 35, 3, pp. 269-293, 1999.

Scharstein, et al., "A taxonomy and evaluation of dense two-frame stereo correspondence algorithms," International Journal of Computer Vision, vol. 47(1), pp. 7-42, 2002.

Sato, et al., "Stability issues in recovering illumination distribution from brightness in shadows," IEEE Conf. on CVPR, pp. 400-407, 2001.

Huggins, et al., "Finding Folds: On the Appearance and Identification of Occlusion," IEEE Conf. on Computer Vision and Pattern Recognition, IEEE Computer Society, vol. 2, pp. 718-725, 2001.

Langer, et al., "Space occupancy using multiple shadowimages," International Conference on Intelligent Robots and Systems, pp. 390-396, 1995.

Daum, et al., "On 3-D surface reconstruction using shape from shadows," CVPR, pp. 461-468, 1998.

Kriegman, et al., "What shadows reveal about object structure," Journal of the Optical Society of America, pp. 1804-1813, 2001.

Savarese, et al., "Shadow Carving," Proc. of the Int. Conf. on Computer Vision, 2001.

* cited by examiner

STYLIZED RENDERING USING A MULTI-FLASH CAMERA

RELATED APPLICATION

This application is a continuation-in-part of U.S. patent application Ser. No. 10/392,061, "Non-Photorealistic Camera," filed on Mar. 19, 2003 now U.S. Pat. No. 7,295,720 by Raskar.

FIELD OF THE INVENTION

The invention relates generally to rendering non-photorealistic images, and more particularly to generating non-photorealistic images from images acquired of natural scenes and objects.

BACKGROUND OF THE INVENTION

The object of the invention to generate stylized images from images acquired of real world scenes and objects. The stylized images can facilitate the viewer's comprehension of the shape of the objects depicted. Non-photorealistic rendering (NPR) techniques aim to outline shapes of objects, highlight moving parts to illustrate action, and reduce visual clutter such as shadows and texture details. Stylized images are useful for rendering low-contrast and geometrically complex scenes such as mechanical parts, plants or the internals of a patient undergoing examinations such as endoscopy.

When a rich 3D geometric model of the scene is available, rendering subsets of view-dependent contours of simple scenes is a relatively well-understood task, Saito et al., "Comprehensible Rendering of 3-D Shapes," Proceedings of SIGGRAPH'90, 1990, and Markosian et al., "Real-Time Non-photorealistic Rendering," Proceedings of SIGGRAPH'97, pp. 415-420, 1997. However, extending that approach to real world scenes, such as flowering plant, by first generating 3D models of the plant is difficult, if not almost impossible.

It is desired to bypass the acquisition of the 3D scene geometry. Instead, the object is to generate stylized images of real world scenes directly from images acquired by a camera.

In the prior art, the majority of the available techniques process a single image to generate a stylized image. Typically, morphological operations, such as image segmentation, edge detection and color assignment are applied. Some techniques aim for stylized depiction, see DeCarlo et al., "Stylization and Abstraction of Photographs," Proc. Siggraph 02, ACM Press, 2002, and Hertzmann, "Painterly Rendering with Curved Brush Strokes of Multiple Sizes," ACM SIGGRAPH, pp. 453-460, 1998, while other techniques enhance legibility.

Interactive techniques for stylized rendering such as rotoscoping are also known. However, it is desired to automate the process of generating stylized images, instead of requiring meticulous manual operations.

In aerial imagery, shadows in the scene are identified by thresholding a single intensity image, assuming a flat ground and an uniform albedo, to infer landscape and building heights, see Huertas et al., "Detecting buildings in aerial images," Computer Vision, Graphics and Image Processing 41, 2, pp. 131-152, 1988, Irvin et al, "Methods for exploiting the relationship between buildings and their shadows in aerial imagery," IEEE Transactions on Systems, Man and Cybernetics 19, 6, pp. 1564-1575, 1989, and Lin et al., "Building detection and description from a single intensity image," Computer Vision and Image Understanding: CVIU 72, 2, pp. 101-121, 1998.

Some techniques improve shadow capture with shadow extraction techniques to determine shadow mattes, Chuang et al., "Shadow matting and compositing," ACM Trans. Graph. 22, 3, pp. 494-500, 2003, or to remove shadows altogether to improve scene segmentation, Toyama et al., "Wallflower: Principles and Practice of Background Maintenance," ICCV, pp. 255-261, 1999. Using intrinsic images, other techniques remove shadows without explicitly detecting the shadows, Weiss, "Deriving intrinsic images from image sequences," Proceedings of ICCV, vol. 2, pp. 68-75, 2001.

Stereo techniques with passive and active illumination are generally designed to determine depth values or surface orientation, rather than to detect depth edges. Depth edges or discontinuities present difficulties for traditional stereo techniques due to partial-occlusions, which confuse the matching process, Geiger et al., "Occlusions and binocular stereo," European Conference on Computer Vision, pp. 425-433, 1992.

Some techniques try to model the discontinuities and occlusions directly, Intille et al., "Disparity-space images and large occlusion stereo," ECCV (2), pp. 179-186, 1994, Birchfield et al., "Depth discontinuities by pixel-to-pixel stereo," International Journal of Computer Vision 35, 3, pp. 269-293, 1999, and Scharstein et al., "A taxonomy and evaluation of dense two-frame stereo correspondence algorithms," International Journal of Computer Vision, vol. 47(1), pp. 7-42, 2002.

Active illumination methods, which generally give better results, have been used for depth extraction, shape from shading, shape-time stereo, and photometric stereo. Unfortunately, those methods are unstable around depth discontinuities, Sato et al., "Stability issues in recovering illumination distribution from brightness in shadows," IEEE Conf. on CVPR, pp. 400-407, 2001.

One technique performs logical operations on detected intensity edges in images acquired under widely varying illumination to preserve shape boundaries, Shirai et al., "Extraction of the line drawing of 3-dimensional objects by sequential illumination from several directions," Pattern Recognition, 4, 4, pp. 345-351, 1972. That technique is also limited to uniform albedo scenes.

With photometric stereo techniques, it is possible to analyze intensity statistics to detect high curvature regions at occluding contours or folds, Huggins et al., "Finding Folds: On the Appearance and Identification of Occlusion," IEEE Conf. on Computer Vision and Pattern Recognition, IEEE Computer Society, vol. 2, pp. 718-725, 2001. That technique detects regions near occluding contours, but not the contours themselves. That technique assumes that the portion of a surface that is locally smooth. Therefore, that technique fails for a flat foreground object like a leaf or piece of paper, or view-independent edges such as corner of a cube.

Techniques that determine shape from shadow or darkness construct a continuous representation, e.g., a shadowgram, from a moving light source. Continuous depth estimates are possible from the shadowgram, Raviv et al., "Reconstruction of three-dimensional surfaces from two-dimensional binary images," IEEE Transactions on Robotics and Automation, vol. 5(5), pp. 701-710, 1989, Langer et al., "Space occupancy using multiple shadowimages," International Conference on Intelligent Robots and Systems, pp. 390-396, 1995, and Daum et al., "On 3-D surface reconstruction using shape from shadows," CVPR, pp. 461-468, 1998. That technique requires an accurate detection of the start and end of shadows. This makes it difficult to estimate continuous heights.

General reviews of shadow-based shape analysis methods are described by Yang, "Shape from Darkness Under Error," PhD thesis, Columbia University, 1996, Kriegman et al., "What shadows reveal about object structure," Journal of the Optical Society of America, pp. 1804-1813, 2001, and Savarese et al., "Shadow Carving," Proc. of the Int. Conf. on Computer Vision, 2001.

A common limitation of known active illuminations methods is that the light sources need to surround the object, in order to give the image significant shading and shadow variation from estimated or known 3D light positions. This necessitates a fixed lighting rig, which limits the application of these techniques to studio or industrial settings.

It is desired to extract depth edges from images in a manner that is complementary with known methods for determining depth and 3D surface shape, because depth edges often violate smoothness assumptions inherent in many techniques.

If locations of depth discontinuities can be detected reliably and supplied as input, then the performance of many 3D surface reconstruction processes can be significantly enhanced.

It is desired to detect depth edges without solving a correspondence problem or analyzing pixel intensity statistics with moving lights. It is further desired that NPR images can be generated from complex real world scenes where surface normals change rapidly, such as a potted plant, or a scene with high depth complexity or low intensity changes, such as a car engine or a human bone undergoing medical examination.

SUMMARY OF THE INVENTION

The invention provides a system and method for non-photorealistic rendering (NPR) that accurately captures and conveys shape features of real-world scenes and objects, without reconstructing a 3D model.

The invention uses a camera with multiple light sources, e.g., flash units that are positioned on the body of the camera, around the lens, to cast shadows along depth discontinuities in the scene from different angles.

A projective-geometric relationship between the camera and flash units then exploited to detect depth discontinuities and distinguish the discontinuities from intensity edges due to material discontinuities in the scene.

The invention utilizes detected edge features to generate stylized static and animated images, i.e., videos. The detected features can be highlighted, and unnecessary details can be suppressed. In addition, features from multiple images can be combined. The resulting images convey clearly the 3D structure of real world scenes and objects.

The system according to the invention can be constructed as a single package, similar in size and shape to a conventional digital camera. Thus, the system according to the invention is portable, easy to use, and inexpensive to manufacture, compared to prior art NPR systems and methods.

DETAILED DESCRIPTION OF THE PREFERRED EMBODIMENT

NPR Camera

Figure 1A:
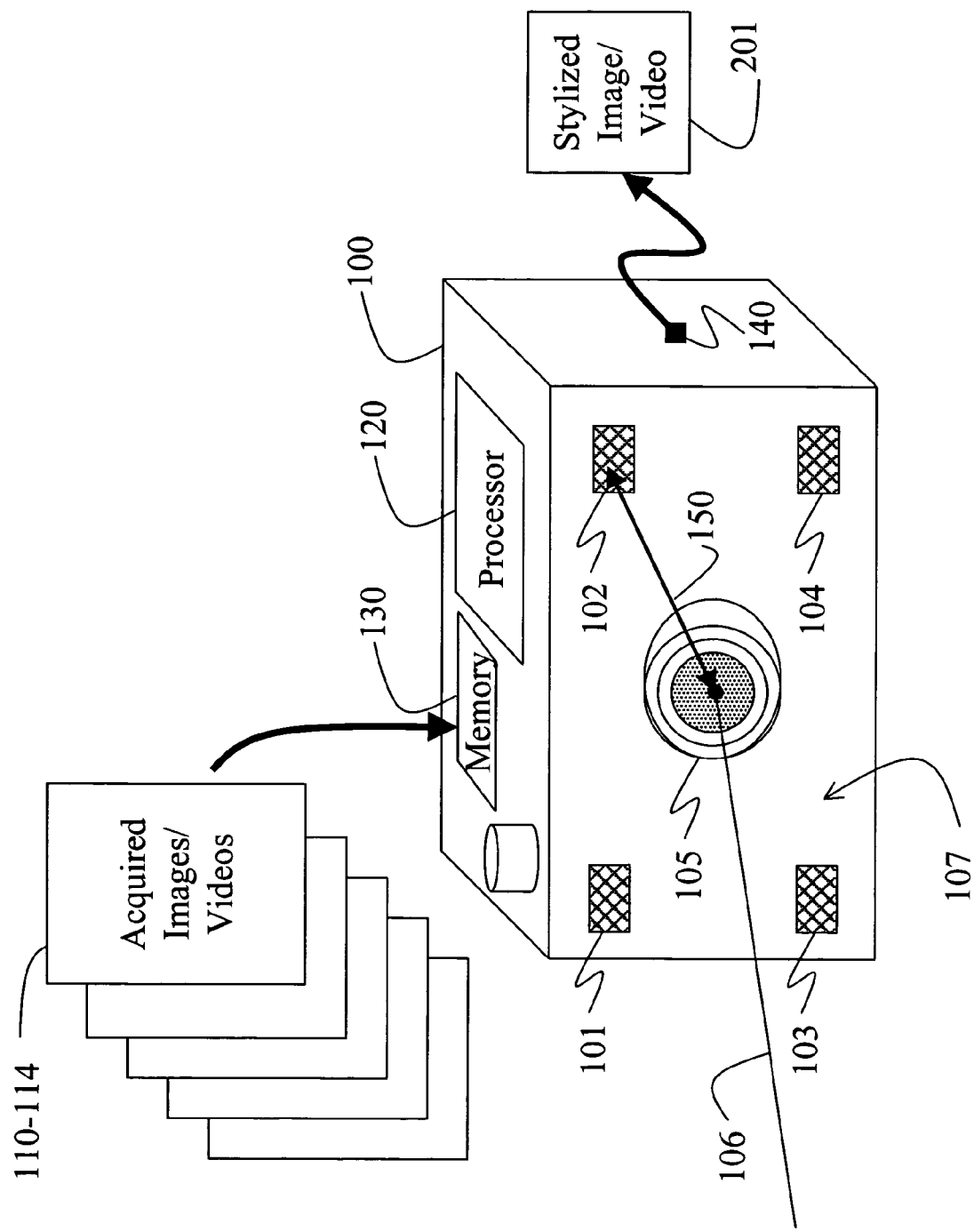
FIG. 1A is a block diagram of a non-photorealistic camera according to the invention.

FIG. 1A shows a digital camera 100 for generating non-photorealistic (NPR) images according to our invention. The camera 100 includes a plurality of light sources, e.g., flash units 101-104, and a single lens 105. The flash units 101-104 are distributed around a center of projection (COP) 106 of the lens 105. For best results, the flash units are placed as close to the COP as possible. Therefore, it makes sense to have the flash units mounted on a front surface 107 of the camera body.

In one embodiment described below, the flash units are positioned at different distances from a center of projection of the lens.

Figure 1B:
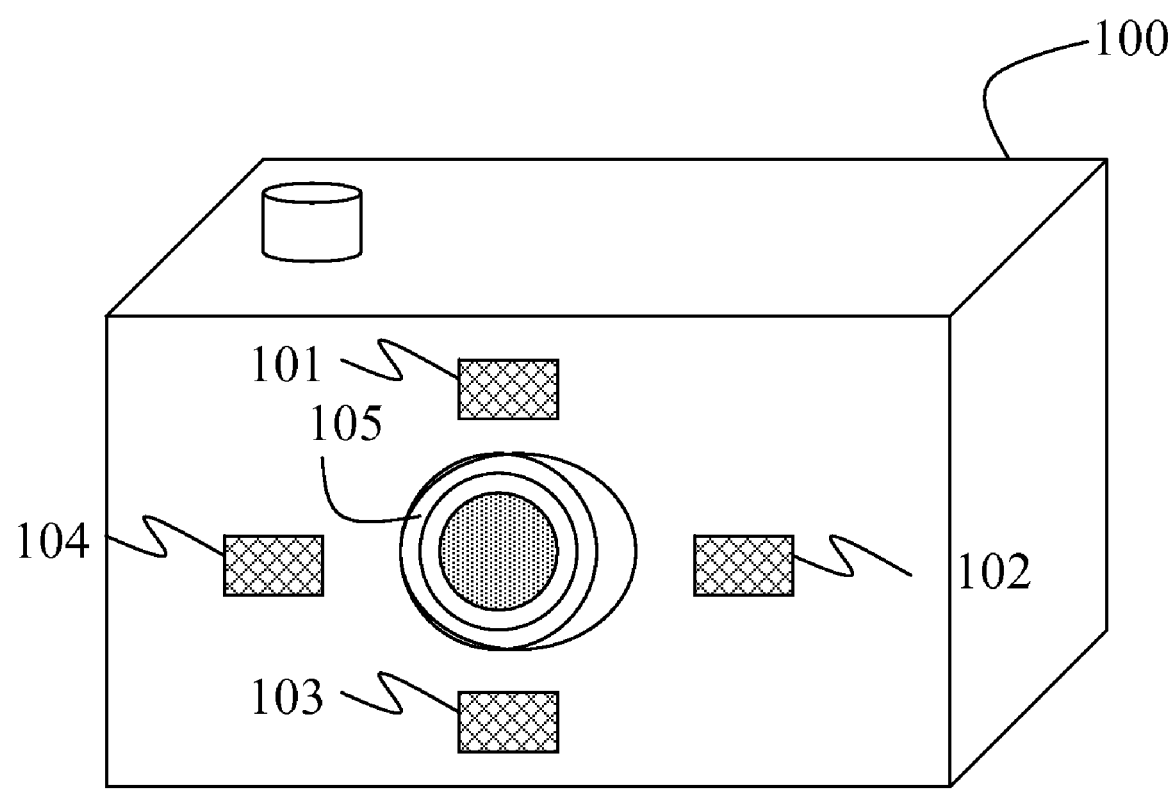
FIG. 1B is a block diagram of the camera of FIG. 1A with an alternative arrangement of flash units.

In an optimal configuration shown in FIG. 1B, the flash units 101-104 are operated in left-right and top-bottom pairs. This allows pixels in images 110-114 to be imaged for at least four lighting conditions, to produce bottom, top, left, and right shadows. Thus, neighboring pixels are shadowed at least in one image, and not shadowed in at least one other image. One image can also be acquired with ambient lighting so the shadows are marginal, if at all.

Figure 1C:
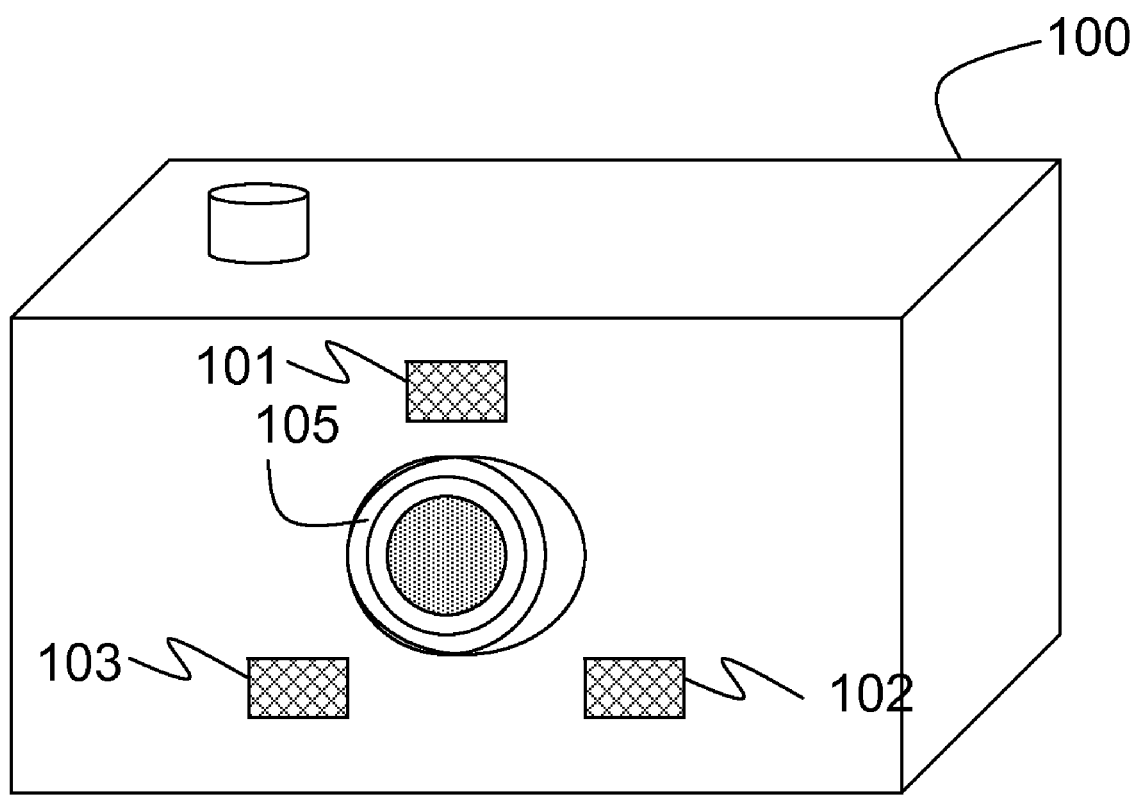
FIG. 1C is a block diagram of the camera of FIG. 1A with another alternative arrangement of flash units.

This configuration also makes an epipolar traversal efficient. For the left-right pair, the traversal can be approximated along horizontal scan lines. For the top-bottom pair, the traversal is along the vertical direction. FIG. 1C shows an arrangement with three flash units.

The flash units can be triggered by optically coupled LEDs. The LEDs are turned on in a sequence, one by one, by a microcontroller 120 to activate the corresponding flash units. The flash duration is about 4 milliseconds. One image is acquired for each illumination of the scene by one of the flash units.

The resolution of the camera is about 4 Megapixels, although lower and higher resolutions are also possible.

As with all modern digital cameras, our camera also includes the microprocessor 120, and memory 130. The microprocessor 120 is designed to perform the operations described herein, specifically a method 200 for generating a stylized image, see FIG. 2.

The memory 130 is used to store the acquired images, and other intermediate images in a linearized form. The memory also stores data used by the methods and procedures described herein. The output stylized image 201 can also be stored in the memory, for later down-loading, via a port 140, to an external device for viewing.

It should be noted that the camera 100 can take multiple images in rapid succession to produce a sequence of frames or a video. These can also be stylized as described herein. It should also be noted that the images 110-114 can be acquired by using other techniques consistent with the invention, for later processing in a stand-alone processor, for example, a desk-top system or a portable computing device.

It should also be noted, that the camera can be in the form of a video camera. In this case, the camera acquires multiple sequences of images (videos) such that each sequence corresponds to a different illumination condition by the flash units, and the output is a stylized video.

Camera Operation

Figure 2:
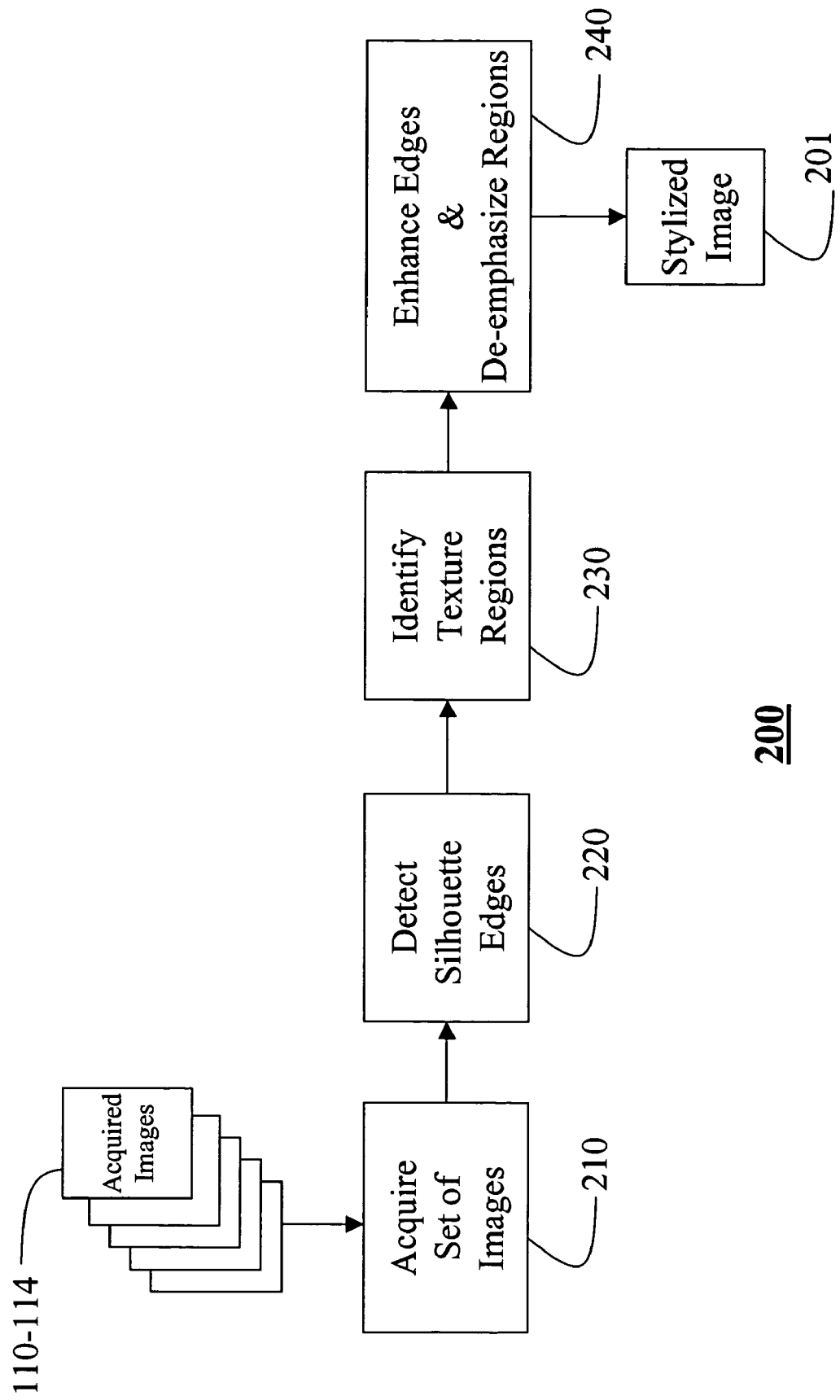
FIG. 2 is a flow diagram of a method for generating a stylized image according to the invention.

FIG. 2 shows our method 200 for generating the stylized image 201 of a scene. By stylized, we mean any non-photorealistic image with specific details such as edges enhanced, and other details such as texture and flat backgrounds reduced, abstracted or otherwise simplified as described herein.

First, the set of images 110-114 is acquired 210 by the camera 100 of FIG. 1, or some other camera and flash units that are similar to the configuration shown in the Figures. Each image is acquired under a different controlled lighting condition. For the configuration shown, one image is taken with ambient lighting, i.e., no flash, one image with the top flash unit, one image with the bottom flash unit, one image with the left flash unit, and one image with the right flash unit. Minimally, two flash units and three images are required, better results can be obtained with additional images and flash units, e.g., four to eight. Even better results can be obtained when the flash units are placed at different distances from the center of projection of the lens.

The set of images is processed by the microprocessor 120 to detect 220 silhouette edges, and identify 230 texture regions. Then, the silhouette edges and texture regions of a combination of the images are used to provide the stylized image 201. For example, a width of silhouette edges is made proportional to a size of the depth discontinuity at the edges, and textured regions are de-emphasized according to color gradients.

We classify each pixel in each image as being either a silhouette edge pixel, a texture edge pixel, or a featureless pixel.

We use the term silhouette edge pixels to refer to those pixels with a C0 depth discontinuity in the scene. These include pixels that correspond to points on the surface of an object in the scene where the normal is perpendicular to a viewing direction. We also include pixels corresponding to boundaries of thin objects, e.g., a leaf or sheet of paper, and view-independent edges of objects such as a cube, both of these types of objects have depth discontinuities. Silhouette edge pixels can also belong to the interior of an object due to self-occlusion.

Texture edge pixels correspond to changes in reflectance and material discontinuities in the scene. Textured regions are typically delineated by texture edges. However, texture regions may not be completely enclosed.

Pixels in featureless regions of the input images correspond to regions in the scene with near constant reflectance and low curvature, e.g., a flat background wall. These pixels can also correspond to minor changes in appearance due to changes in the illumination or viewing direction, including anisotropic reflections on "shiny" materials such as metal and plastic.

Image Acquisition

The set of images 110-114 is acquired 210 of a scene with the flash units 101-104 placed very close to the center of projection (COP) 106 of the lens 105, see FIG. 1. Due to the small baseline 150 between the COP and the flash units, a narrow sliver of a shadow appears near each silhouette edge in the image that represents depth discontinuities (edges) in the scene.

By combining information about attached cast shadows from two or more images with distinct different lighting, we can detect the silhouette edge pixels.

Herein, an attached cast shadow is defined in an image space. This definition is quite different from the traditional shape-from-shadow definition in object space. There, the surface boundary, where a light ray is tangential to a smooth object, is considered to have attached or 'self' shadows. Here, the attached cast shadow is generated when the object and the shadow cast by the object on the background are contiguous in image space.

For most view independent edges, the shadowed areas include shadows cast on a next depth layer. For view-dependent edges, a small part of the shadow area includes self-shadows.

Figure 5B:
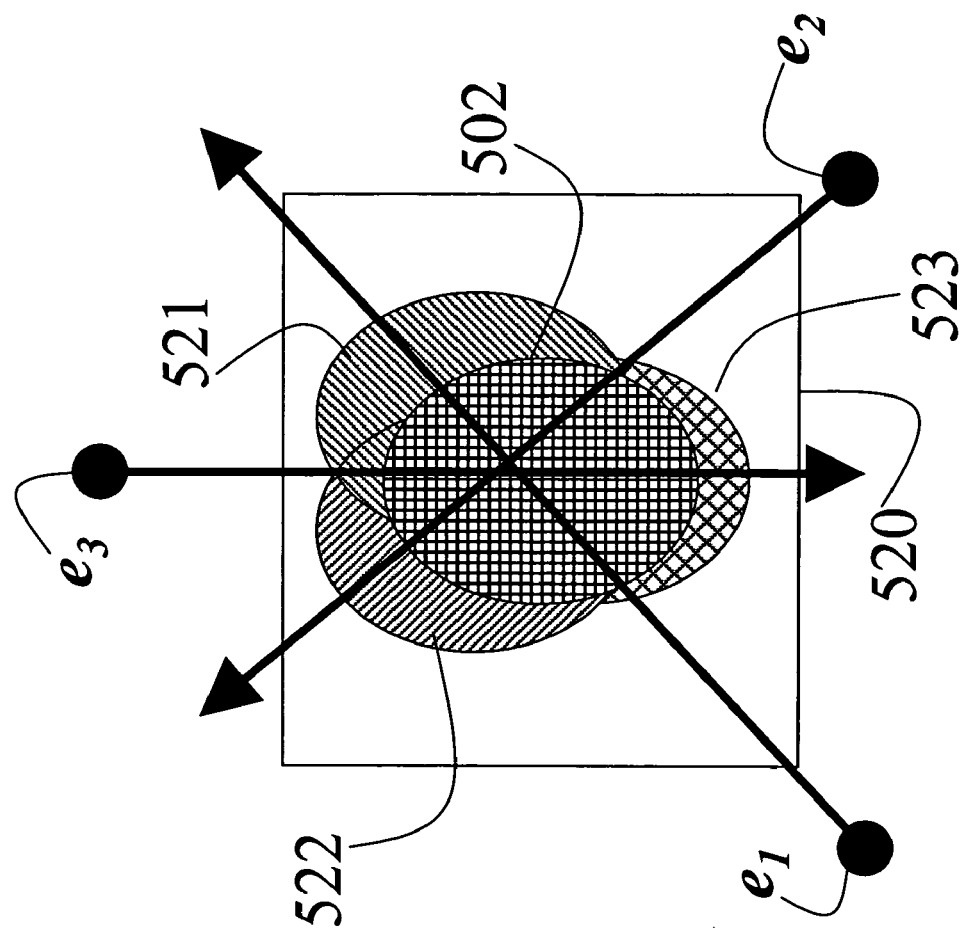
FIGS. 5A-5B are block diagrams of epipolar rays corresponding to shadows cast.

Generally, shadows are on the 'opposite' side of the flash units, i.e., if the flash unit is to the right of the lens, then the shadows appear to the left of the depth discontinuities in the camera image, and different flash units cast shadows at different locations, see FIG. 5B.

Detecting Silhouette Edge Pixels

Figure 3:
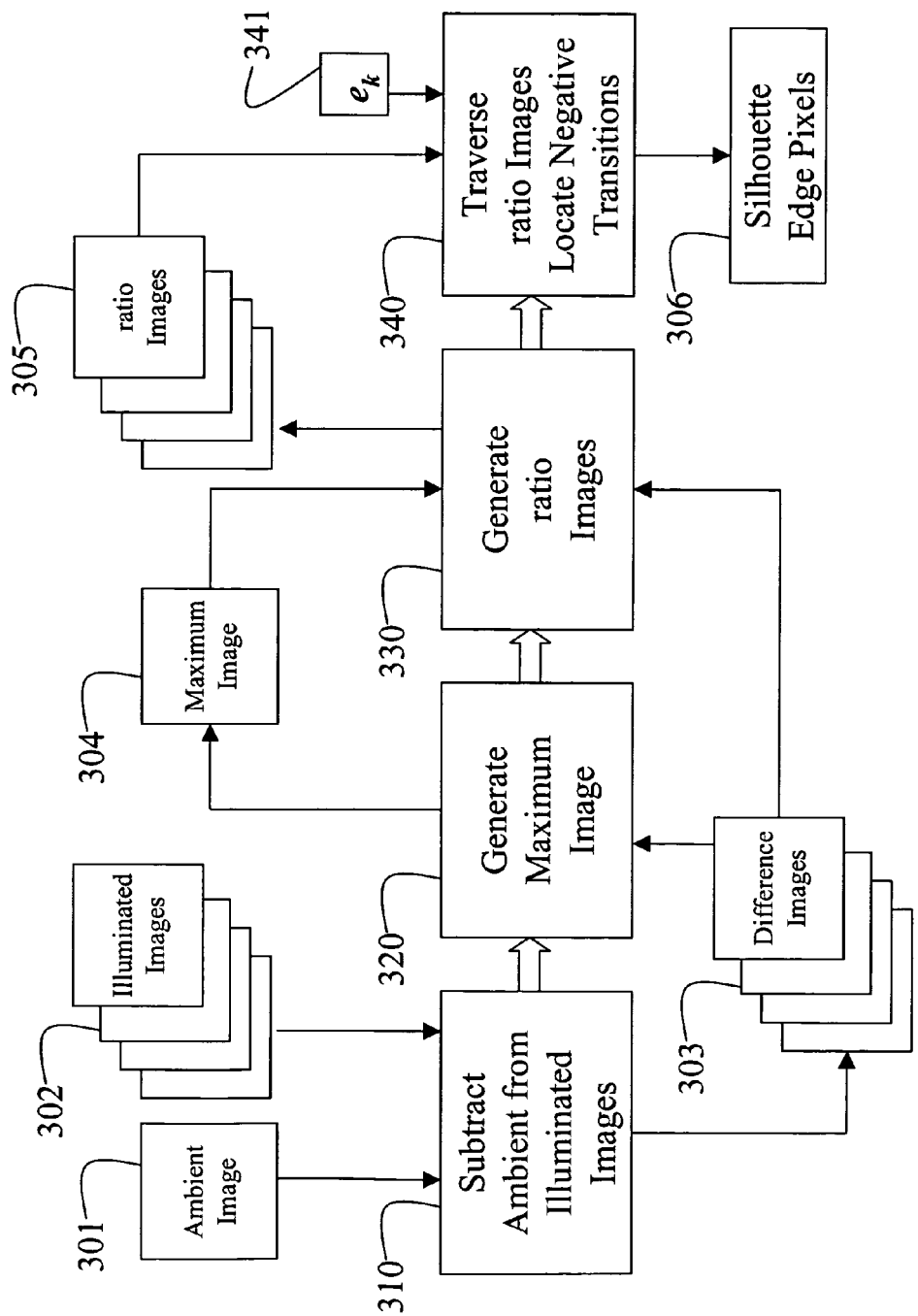
FIG. 3 is a flow diagram of a method for detecting silhouette edges.

FIG. 3A shows a procedure 300 for detecting silhouette edge pixels that is basic to our approach. The idea is surprisingly simple. Although our image acquisition process is closely related to photometric stereo, as far as we know, it has never been used in computer vision systems for detecting depth discontinuities as reflected by shadows in a scene. It allows us to classify other edges by the process of elimination.

The basic procedure 300 operates as follows.

Acquire an ambient image $I_{ambient}$ 301 of a scene, where $I_{ambient}$ is an image taken under ambient lighting without any of the flash units.

Acquire n controlled illuminated images $I'_k$ 302 of the scene, for k=1, ..., n with a point light source, i.e., a flash unit, at position $P_k$. The images can be acquired in any order. In our example, n=4.

Difference images $I_k$ 303 are obtained by subtracting 310 the ambient image from the illuminated images, $I_k' - I_{ambient}$.

A maximum image $I_{max}$ 304 is generated 320 from difference images as $I_{max}(x) = \max_k(I_k(x))$, k=1, ..., n. That is, each pixel in the maximum image has a maximum intensity value from any of the corresponding pixels in the difference images.

For each difference image $I_k$, generate 330 a radial image 305 by division, for all pixels (x), $R_k(x) = I_k(x)/I_{max}(x)$. That is, each difference image is divided by the maximum image.

A pixel $e_k$ 341 in the radial image is an epipole pixel, i.e., the epipole pixel is an image of the corresponding light source at $P_k$. Conventional stereoscopic techniques can be used to locate the epipole.

For each radial image $R_k$ 305, traverse 340 the image while comparing pixel intensities with the pixel intensity of the epipole pixel. By radial traversal, we mean detecting intensity edges along a radial line from the epipole pixel to a given pixel. This traversal detects transitions from lighted areas to shadow areas, and vise versa.

Locate pixels y with steps with a negative intensity transition. Mark these pixel y with the negative intensity transition as a silhouette edge pixel 306. All pixels identified as silhouette pixels can be overlaid in the maximum image, so that when all images have been processed, the maximum image shows all silhouette contours.

Figure 4:
FIG. 4 is an image of a vase of flowers with silhouette edge enhancement according to the invention.

FIG. 4 is a stylized image 400 of a vase of flowers with silhouette edge enhancement according to the invention.

With a sufficiently large number of flash units n, minimally two, but typically four to eight, silhouette edge pixels at all orientation and sufficient depth difference can be detected. If the silhouette has a component perpendicular to the epipolar line, then an edge pixel with negative intensity transition from the illuminated the shadowed area is detected.

It should be understood, that for a very simple scene some silhouette edges could be detected from a single illuminated image. For example, in a scene with mostly vertical depth discontinuities, e.g., a picket fence, edges can be detected by a single side illumination.

We now describe the procedure 300 in greater detail. The $I_{max}$ image is an approximation of the image with the light source at the camera's COP 106. This approximation is close when the point light sources have the same magnitude, and a baseline between the light sources is substantially smaller than a depth of the scene. Thus, the $I_{max}$ image has no pixels in a shadow.

The ratio ($I_k/I_{max}$) is substantially close to 1 in areas illuminated by light source k, and substantially close to zero in shadowed areas. Hence, the locations of the negative intensity transitions mark the shadow edges.

An intensity at a pixel x for a 3D scene point X with diffuse reflection in the camera coordinate system, given light source at $P_k$ is given by $I_k(x)$.

If the 3D scene point X is illuminated by light source $P_k$, then $$I_k(x) = \mu_k \rho_k L_k(x) \cdot N(x), \text{ otherwise,}$$

$$I_k(x) = 0,$$

where value $\mu_k$ is the magnitude of the light, $\rho_k(x)$ is the reflectance at point X in the scene, $L_k(x)$ is a normalized light vector $L_k(x) = P_k - X$, and $N(x)$ is a surface normal, all in the coordinate system of the camera.

Thus, when point X in the scene is illuminated by the point light source $P_k$, the ratio is as follows:

$$R_k(x) = I_k(x)/I_{max}(x) = \mu_k(L_k(x) \cdot N(x))/\max_i(\mu_k(L_i(x) \cdot N(x))).$$

For diffuse objects with a non-zero $\rho_k$, the ratio $R_k(x)$ is independent of the albedo $\rho_k$, and only a function of the local geometry. Furthermore, if light sources are close to camera's COP 106, and X>>P(k), then this ratio is approximately ($\mu_k/\max_i(\mu_k)$), which is a constant for a set of omni-directional light sources. Note, $R_k(x)$ is very low near silhouettes of a curved object with view dependent edges.

This is because ($L_k(x) \cdot N(x) \approx 0$), and the dot product for light sources on the opposite side is larger, i.e., ($L_i(x) \cdot N(x) > L(x) \cdot N(x)$). Thus, the intensity of pixels in the radial image $R_k(x)$ decreases rapidly, even though the pixel is not in a shadowed area. However, this is not a major issue and results only in a thickening of the shadowed region, and does not lead to a reversal of the intensity profile along an epipolar line.

Due to secondary scattering, the ratio $R_k(x)$ is thus substantially close to zero in shadowed areas. The intensity profile along the epipolar line shows a sharp negative transition at silhouette edge as we traverse from non-shadowed foreground to shadowed background, and as a sharp positive transition as we traverse from shadowed to non-shadowed region on the background.

Any standard 1-D edge detector can be applied along the radial epipolar line from the epipole to a given pixel detects both these transitions, and we mark pixels with the negative transition as a silhouette edge pixels.

Because we detect an intensity transition, noise and secondary scattering can affect the accuracy of the position of the detected silhouette edge pixels, but always their presence.

There are a few conditions when a negative intensity transition at a silhouette edge cannot be detected in the radial image R(x), or when other conditions cause spurious transitions. The silhouettes can be missed due to detached shadows, low background albedo, holes and valleys, or when silhouettes lie in shadowed regions. Some pixels can be misclassified as silhouette edge pixels due to specularities, self-shadows, or view-dependent silhouettes.

There is a tradeoff in selecting the baseline between the camera's COP and the flash units. For a larger image width for shadow d, a larger baseline is better, but a smaller baseline avoids separation of shadows. Better results can be obtained when the baseline varies.

A width of a particular attached cast shadow in an image is $d = f(z_2 - z_1)B/(z_1 \cdot z_2)$, where f is the focal length, B is the baseline in mm, and $z_1$ and $z_2$ are depths, in mm, to the shadowing and shadowed edge.

The shadow separation occurs when a threshold width T of the object is smaller than $(z_2 - z_1) \times B/z_2$. Therefore, a smaller baseline allows a smaller width T without shadow separation. Because the effective focal length can be increased using a higher resolution camera, we use a high-resolution camera with a very small baseline and large distance or 'depth' to the object ($z_2$).

Non-uniformity of lights sources can also affect the results. It affects the ratio $R_k(x)$ because ($\mu_k/\max_i(\mu_k)$) is not a constant. Fortunately, even with non-uniform light sources, the lobe intensity changes smoothly across the field, so it does not introduce spurious edges in $R_k$.

Detection of negative intensity steps leading into a shadow region is a binary decision, making our method robust to noise. However, light produced by the flash units still needs to override the ambient light. We also rely on the assumption that silhouettes are separated from the background with a finite depth, which implies we need a background. An alternative embodiment described below, does not rely on this requirement to have a background.

Reducing Detail in Textured Regions

We also provide a procedure for reducing details or complexity in regions of images that are not associated with the silhouettes of a scene, such as texture and illumination variations. Given the silhouettes edge pixels 306, it is now possible to identify 230 pixels belonging to texture edges. Thus, textured regions can be identified. These pixels are independent of the direction of illumination. Texture edges are intensity edges in the maximum image $I_{max}$ minus the detected silhouette edges.

Ideally, we would like to identify all textured regions, i.e., sets of pixels corresponding to a texture detail in the original image, and de-emphasize the texture detail in the output image 201. However, although we can identify texture edges, we cannot reliably find all textured regions. This is because texture edges do not always form an enclosed contour around a textured region, due to gaps after silhouette edge detection, or because such regions can fade into dominant colors in the scene.

Therefore, we desire to perform a 'tunable' abstraction where, for example, geometric features can be given more importance, and texture features, e.g., edges and regions, can be de-emphasized. We also want to eliminate pixels that do not have the dominant colors.

One solution blurs regions associated with the texture edges. One could simply assign a weighted average of the colors of the neighboring featureless pixels to texture pixels and nearby pixels. However, that only diminishes the textured region boundaries and does not remove the gradients. Furthermore, the textured regions, delineated by texture edges, can be several pixels wide, and thus, are not completely eliminated. Another approach uses distance fields or diffusion type techniques.

Instead of pixel-level operations, we use an edge-based procedure.

Our edge-based procedure is based on the observation that high intensity gradients at texture pixels separate non-dominant color pixels from the dominant color pixels. If the image is reconstructed from gradients without the high gradients at texture pixels, then the non-dominant color pixels are automatically filled in smoothly by colors from the other side of the texture pixels. No decision needs to be made about what intensity values to use to fill in holes, and no feathering nor blurring needs to be done, as is required with conventional pixel-based systems.

Edge Enhancement

Our procedure to detect silhouette edge pixels also generates additional useful information that can be used for image enhancement.

The width of a shadow $d=f(z_2-z_1)B/(z_1z_2)$, is proportional to a depth difference $(z_2-z_1)$ at the depth discontinuity. This information can be used during image enhancement.

At a silhouette edge, we can determine which side of the silhouette belongs to the foreground and which side belongs to the background. The calculation is based on which side of the edge has a higher intensity in the $R_k$ image at the negative transition along the epipolar line.

This qualitative depth relationship can also be used for edge enhancement. We first generate a silhouette image, where silhouettes are in white on a black background. We convolve with a filter that is the gradient of an edge enhancement filter. We use a Gaussian filter minus an impulse function. When we integrate the convolved image, we obtain sharp transition at the silhouette edges.

Comparison with the Prior Art

Better lighting could be used to improve contrast and highlight objects with respect to the background. While the success of this approach generally depends on the skill of the photographer, we provide a general solution with clear geometric basis. In addition, because the light sources are close to the camera's COP, our single self-sufficient camera 100 does not require external light sources, simplifying operations.

A second simple option is to perform edge-detection on the intensity image. However, sharp changes in image values do not necessarily imply object boundaries, and vice versa. For example, a complex scene can generate many spurious intensity edges, while in a simple image very few intensity edges are detected. Hence, image enhancement strategies that rely on examining image value changes alone often fail.

Previous NPR techniques that work on a single image rely of very high quality, good contrast images so that intensity edges detection and color segmentation are reliable.

Our approach may appear to be similar to active illumination techniques, such as traditional photometric stereo and Helmholtz stereo. However, depth discontinuities present difficulties for a traditional stereo technique. Stereo techniques often fails due to half-occlusions, which confuse the matching process.

Photometric stereo simultaneously estimates geometry and albedo across a scene. The main limitation of classical photometric stereo is that the light sources must be far apart from the camera's COP, and the positions of the light sources must be accurately known. This requires a fixed lighting rig as might be possible in an studio, industrial or laboratory setting, but not in a self-contained camera unit. Furthermore, that approach relies on detecting normals along smooth surfaces, and fails at depth discontinuities, shadowed regions and half-occluded sections.

Our approach is exactly opposite, and takes binary decisions for intensity variations at a scene depth discontinuity.

For Helmholtz stereo, shadowed and half-occluded regions are in correspondence. A surface in a shadow in a left image is not visible in the right image, and vice versa. The problem is that computing shadowed region in a single image is a difficult problem. The only reliable way to classify a pixel to be in shadow region is to compare it with yet another pixel when it is not in the shadow. This binary decision makes our technique robust. We also do not rely on any matching or correlation process, and most operations can be done on a per pixel basis. This enables us to integrate the entire method in the camera's microprocessor.

Description of Additional Embodiments

Our method for generating a stylized image of a scene includes the following steps. First, acquire a set of images of the scene under shifted light caused by multiple flash units positioned around the lens of a camera, and ambient lighting. These images are processed to automatically detect features, such as depth edges, intensity edges, and texture edges to determine qualitative depth relationships among the features. An output image is a combination of the acquired images, in which detected features are enhanced according to the detected features and the qualitative relationships to provide a stylized image.

We use the term depth edges to refer to those with edges with a C0 depth discontinuity. Depth edges correspond to internal or external occluding contours, or silhouettes, for smooth surfaces, boundaries of thin objects, i.e., a leaf or a sheet of paper, or view-independent edge objects, e.g., a cube.

The recovered depth edges are signed. In a local neighborhood, a side with lower depth value, e.g., the foreground, is considered positive, while an opposite side, e.g., a background, is negative.

Examples texture edges are reflectance changes or material discontinuities. Texture edges typically delineate textured regions but may not form a closed contour.

Depth Edges

Figure 5A:
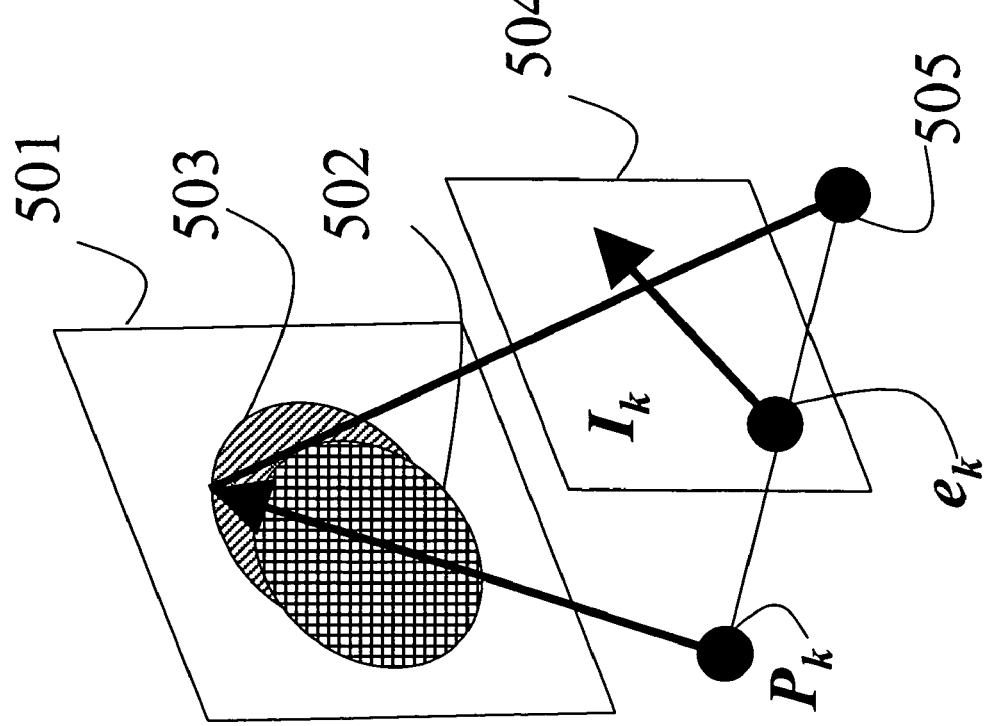

As shown in FIGS. 5A-5B, our method for detecting depth edges is the foundation for our approach and allows us to classify other edges by a process of elimination. Our method is based on two observations regarding epipolar shadow geometry.

In FIG. 5A, a scene 501 includes an object 502. Because of the lighting used, the object casts a shadow 503 in the image $I_k$ 504 taken by camera 505. We ensure that depth edges of all orientations cause shadow in at least one image, while the same shadowed points are illuminated in some other image.

FIG. 5B shows the images of the object 502 superimposed for epipolar rays originating at $e_1$, $e_2$, and $e_3$ with corresponding shadow 521-523.

The image of the point light source at $P_k$ is at pixel $e_k$ in the camera image, and is called the light epipole. The images of the rays originating at $P_k$ are the epipolar rays originating at $e_k$. If $P_k$ is behind the center of the camera and away from the image plane, the epipolar rays wrap around at infinity.

First, note that, a shadow of a depth edge pixel is constrained to lie along the epipolar ray passing through that pixel. Second, the shadow is observed if and only if the background pixel is on the side of the depth edge opposite the epipole along the epipolar ray. Hence, in general, if two light epipoles lie on opposite sides of an edge, a shadow is observed at the depth edge in one image but not the other.

The basic process is as follows, for n light sources positioned at positions $P_1, P_2, \ldots P_n$.

Acquire an image $I_0$ with ambient light.
Acquire images $I_{k,0}$, k=1, . . . , n with a light source at $P_k$.
Determine images $I_k=I_{k,0}-I_0$.
For all pixels x, $I_{max}(x)=\max_k(I_k(x))$, k=1, . . . n.
For each image k,
Generate a ratio image $R_k$, where $R_k(x)=I_k(x)/I_{max}(x)$
For each image $R_k$,
Traverse each epipolar ray from epipole $e_k$
Find pixels y with step edges with negative transition
Mark the pixel y as a depth edge With multiple light sources, e.g., two to eight, placed around the camera, depth edges of all orientation with sufficient depth differences can be detected. In each image, if the dot product of the tangent and the epipolar ray at the depth edge is non-zero, a step edge with negative transition from an illuminated part to shadowed part will be detected. If the depth edge is oriented along the epipolar ray, then the step edge cannot be detected.

Note that the image $I_k$ has ambient component removed, i.e., $I_k = I_{k,0} - I_0$ where $I_0$ is an image acquired with only ambient light, and none of the n light sources on. The base image is the maximum composite image, $I_{max}$, which is an approximation of the image with light source at the camera COP, and in general has no shadows from any of the n light sources. This approximation is close when the n light sources have the same magnitude and the baseline is sufficiently smaller than the depth of the scene being imaged.

Consider the image of a 3D point X, given in camera coordinate system, imaged at pixel x. The intensity, $I_k(x)$, when point X is illuminated by the light source at $P_k$, under Lambertian assumption, is given by $$I_k(x) = \mu_k \rho(x)(\hat{L}_k(x) \cdot N(x)).$$

Otherwise, $I_k(x)$ is zero. The scalar $\mu_k$ is the magnitude of the light intensity and $\rho(x)$ is the reflectance at point X. The value $\hat{L}_k(x)$ is the normalized light vector $\hat{L}_k(x) = P_k - X$, and $N(x)$ is the surface normal, all in the camera coordinate system.

Thus, when point X is seen by $P_k$, the ratio is as follows.

$$R_k(x) = \frac{I_k(x)}{I_{max}(x)} = \frac{\mu_k(\hat{L}_x(x) \cdot N(x))}{\max_i(\mu_i(\hat{L}_i(x) \cdot N(x)))}$$

It is clear that for diffuse objects with non-zero albedo $\rho(x)$, $R_k(x)$ is independent of the albedo $\rho(x)$, and only a function of the local geometry. Further, if the light source-camera baseline $|P_k|$ is small compared to the distance to the point, i.e., $|X| \ll |P_k|$, then this ratio is approximately $\mu_k / \max_i(\mu_i)$, which is a constant for a set of omni-directional light sources.

The ratio values in $(R_k = I_k / I_{max})$ are close to 1.0 in areas illuminated by light source k and close to zero in shadowed regions. In general, the values are not zero due to inter-reflections. The intensity profile along the epipolar ray in the ratio image shows a sharp transition to negative at the depth edge as we traverse from non-shadowed foreground to shadowed background, and a sharp transition to positive as we traverse from shadowed background to a non-shadowed region on the foreground.

This reduces the depth edge detection problem to an intensity step edge detection problem. A one-edge detector along the epipolar ray detects both positive and negative transitions, and we mark the negative transitions as depth edges. As described above, noise and inter-reflections only affect the accuracy of the position but not the detection of presence of the depth edge, because we are detecting a discrete transition and not a continuous value.

In summary, there are essentially three steps:

Generate a ratio image where the values in shadowed regions are close to zero;

Perform intensity edge detection on each ratio image along epipolar rays marking negative step edges as depth edges; and Combine the edge maps from all n images to obtain the final depth edge map.

Material Edges

In addition to depth edges, we also consider illumination and material edges in the image. Illumination edges are boundaries between lit and shadowed regions due to ambient light, rather than the flash units attached to our camera. Because the individual images $I_k$, are free of ambient illumination, they are free of ambient illumination edges. In general, because material edges are independent of illumination direction, they can be classified by a process of elimination. Material edges are intensity edges of $I_{max}$ minus the depth edges. This edge classification scheme works well and involves a minimal number of parameters for tuning. The only parameters we need are those for intensity edge detection of ratio images and Imax image, to detect depth and material edges, respectively.

Our technique to detect depth edges is surprisingly reliable, except for some conditions, such as a false negative when a negative transition at a depth edge cannot be detected in the ratio image $R_k$, or a false positive when other conditions create spurious transitions in $R_k$. The depth edges can be also be missed due to detached shadows, low albedo of background, holes and valleys, or if depth edges lie in shadowed region. Some pixels maybe mislabeled as depth edge pixels due to specularities, self-shadows, or view-dependent depth edges.

Curved Surfaces

The ratio $R_k(x)$ is very low near depth edges of a curved object with view dependent edges. This is because the dot product $(\hat{L}_k(x) \cdot N(x))$ and the dot product for light sources on the 'opposite' side is larger, i.e., $$(\hat{L}_k(x) \cdot N(x)) > (\hat{L}_k(x) \cdot N(x))$$

Thus $R_k(x)$ decreases rapidly even though the pixel is not in a shadowed region. However, this is not a major issue and simply results in a lower slope at the negative transition in $R_k$.

Tradeoff in Selecting a Baseline

A larger baseline distance between the camera and the flash is better. A larger baseline will cast a wider detectable shadow in the image, but a smaller baseline is needed to avoid separation of shadow from the associated depth edge.

The width of the abutting shadow in the image is $d = fB(z_2 - z_1)/(z_1 z_2)$, where f is the focal length, B is baseline, $z_1$ and $z_2$ are depths to the shadowing and shadowed edge. Shadow detachment occurs when the width T of the object is smaller than $(z_2 - z_1)B/z_2$. So a smaller baseline, B, allows narrower objects with a smaller T without shadow separation. Fortunately, with miniaturization and of digital cameras, we can select a small baseline while increasing the pixel resolution proportional to f, so that the product fB remains constant. This enables depth detection for narrow objects.

Hierarchical Baseline

Figure 6:
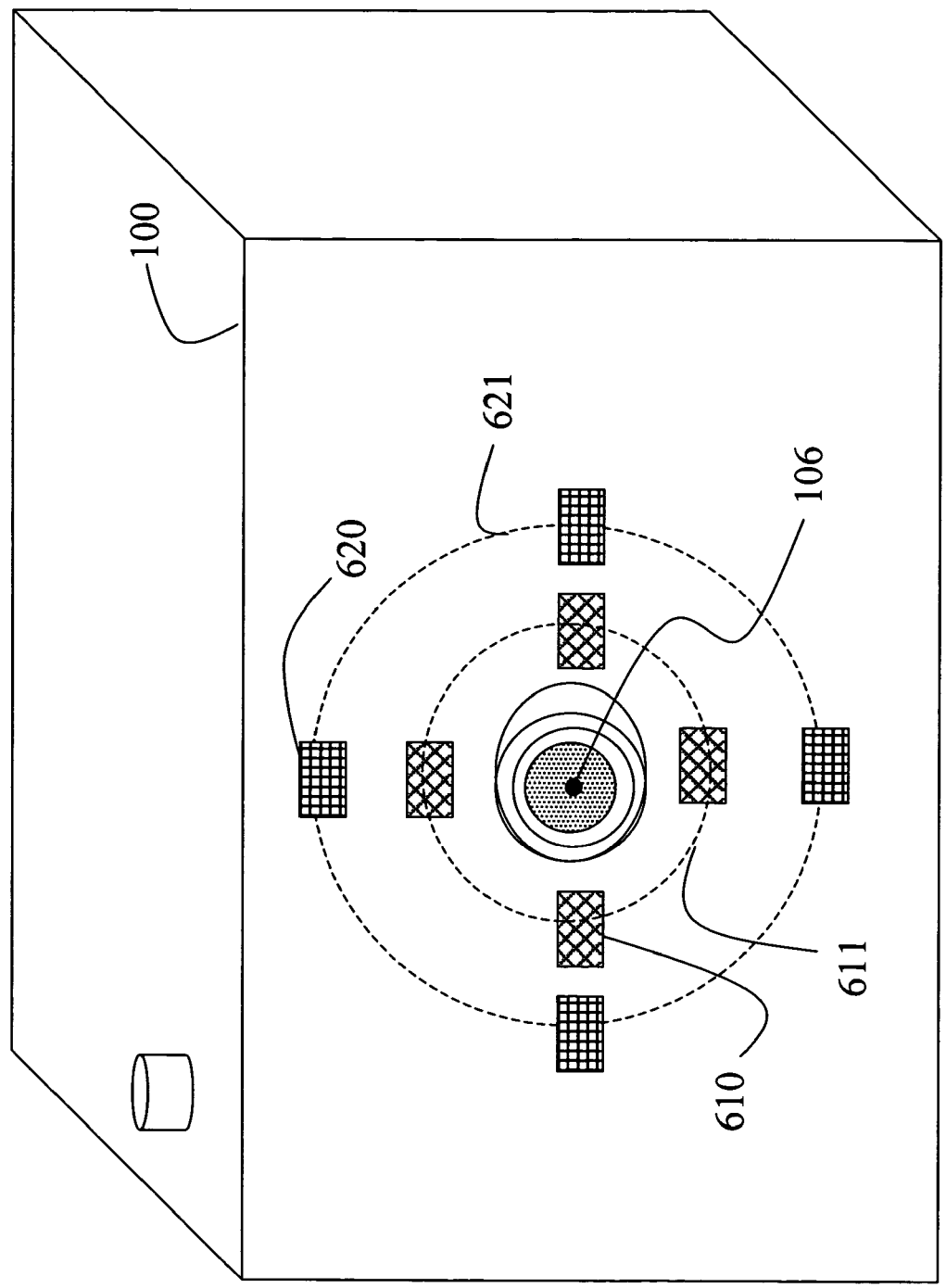
FIG. 6 is a block diagram of a camera with flash units positioned at various distances around a lens of the camera.

As shown in FIG. 6, a hierarchical baseline can be used when camera resolutions are limited. Here a first set of flash units 610 are placed at a first distance 611 from the COP 106 to acquire images $F_S$, and a second set of flash units 620 are placed at a second distance 622 greater then the first distance to acquire images $F_L$.

Thus, we can detect small depth discontinuities with larger baselines, without causing shadow separation at narrow objects using narrow baselines. In practice, two different baselines are sufficient. However, now we have to deal with spurious edges due to shadow separation in the images $F_L$ with the larger baseline. The image $F_S$ with the smaller baseline may miss small depth discontinuities.

There are four cases how the information in pairs of images can be combined to detect depth edges.

Image $F_S$ has undetectable narrow shadows, and image $F_L$ has detectable shadows.

Image $F_S$ has detectable narrow shadows, and image $F_L$ has wide shadows.

Image $F_S$ has detectable shadows but image $F_L$ has detached shadows that overlaps with the shadows of image $F_S$.

Image $F_S$ has detectable shadow and image $F_L$ has detached shadow, but the shadows of image $F_S$ and image $F_L$ do not overlap.

Our method takes the minimum composite of the two images. In the first three cases, this conveniently increases the effective width of the abutting shadow without creating any artifacts, and hence can be treated with the basic process without modifications. For the fourth case, a non-shadow region separates the two shadows in the minimum composite image, so that the shadow in $F_L$ appears spurious.

Our solution is as follows. We determine the depth edges using image $F_S$ and image $F_L$. Then, we traverse the epipolar ray. If the depth edge appears in image $F_S$ at some point $D_1$ but not in image $F_L$, then we traverse the epipolar ray in image $F_L$ until the next detected depth edge. When there is no corresponding depth edge in image $F_L$ then there is no corresponding depth edge in image $F_S$, and we mark this edge as a spurious edge.

Specularities

Specular highlights that appear at a pixel in one image but not others can create spurious transitions in the ratio images. Although methods exist to detect specularities in a single image, detecting specularities reliably in textured regions is difficult.

Our method is based on the fact that specular spots shift according to the shifting of light sources that cause the specularities. We consider three cases how specular spots in different light positions appear in each image: shiny spots remain distinct, e.g., on highly specular surface with a medium curvature; some shiny spots overlap; and shiny spots overlap completely, e.g., on a substantially specular, fronto-parallel planar surface. This last case does not cause spurious gradients in ratio images.

We note that although specularities overlap in the input images, the boundaries, i.e., intensity edges, around specularities in general do not overlap. The main idea is to exploit the gradient variations in the n images at a given pixel (x,y). In the first two cases, if the pixel (x,y) is in a specular region, then the gradient due to specularity boundary is high only in one or a minority of the n images under different lighting.

The median of the n gradients at that pixel will remove the outliers. Our method is an adaptation of the intrinsic image approach described by Weiss, see above. There, shadows in outdoor scenes are removed by noting that shadow boundaries are not static.

We reconstruct the image b using median of gradients of input images as follows:

Determine an intensity gradient, $G_k(x,y)=\nabla I_k(x,y)$,

Find the median of gradients, $G(x,y)=median_k(G_k(x,y))$,

Construct an image I', which minimizes $|\nabla I'-G|$.

We pad the images to square images of a size that is a nearest power of two before applying the integration, and then crop the resulting image back to the original size. We use a similar gradient domain technique to simplify several rendering tasks as described later. The resultant intrinsic image intensity, I(x,y) is used as the denominator for computing the ratio image, instead of the maximum composite image $I_{max}(x,y)$. In specular regions, the ratio $I_k(x,y)/I'(x,y)$ is now is larger than 1.0. This is set to 1.0 so that the negative transitions in the ratio image do not lie in specular parts.

Lack of Background

Thus far, we assumed that depth edges casting shadows on a background are within a finite distance. However, this may not always be the case. In this case only the outermost depth edge, the edge shared by foreground and distant background, can be missed in our method. This can be easily detected with a foreground-background estimation technique. The ratio of images $I_0/I_{max}$, is close to one in background and close to zero in interior of the foreground.

Image Synthesis

NPR based on 3D models is well known, but not so for photographs. In the absence of a full 3D representation of the scene, we exploit the following 2D cues to develop novel rendering algorithms: the sign of the depth edge, i.e., foreground versus background at the edge; relative depth difference based on shadow width, color near the signed edges, and the normal of a smooth surface at the occluding contour.

Our method automates tasks for stylized rendering where meticulous manual operation was originally required, such as image editing or rotoscoping.

Rendering Edges

The depth edge pixels are connected into a contour, and the contour is then smoothed. At T-junctions, unlike traditional methods that select the next edge pixel based on orientation similarity, we use the information from the shadows to resolve the connected component.

Signed Depth Edges

At the negative transition along the epipolar ray in the ratio image, $R_k$ the side of edge with higher intensity is the foreground, and lower intensity, corresponding to shadowed region, is background.

Figure 7:
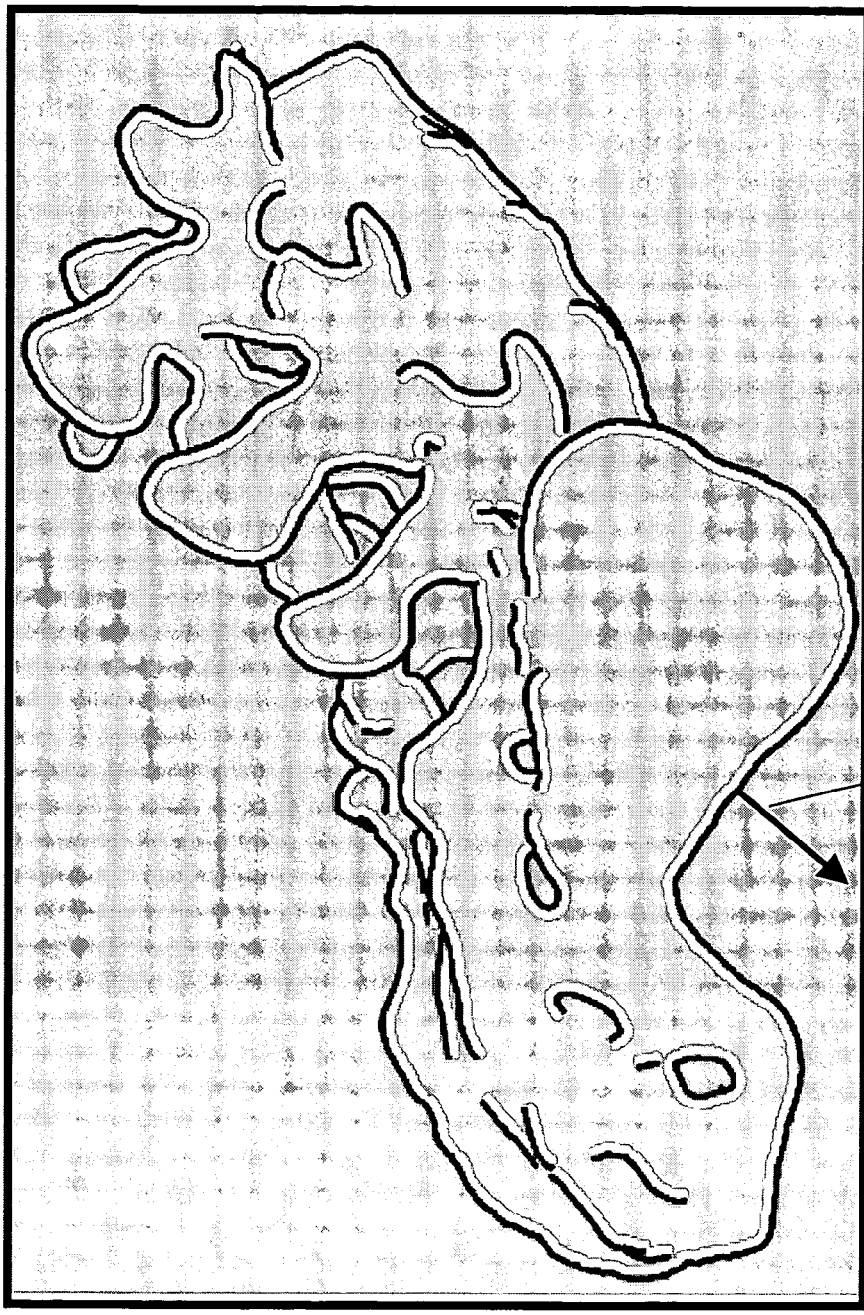
FIG. 7 is an output image with over-under style rendering.

As shown in FIG. 7, this qualitative depth relationship can be used to clearly indicate foreground-background separation at each depth edge of an anatomical part. We emulate the over-under style used by artists in mattes. The foreground sides of the depth edges are white, while the background sides are black. Both sides of the depth edges are rendered by displacing the contour along the surface normal 701.

Light Direction

Figure 8:
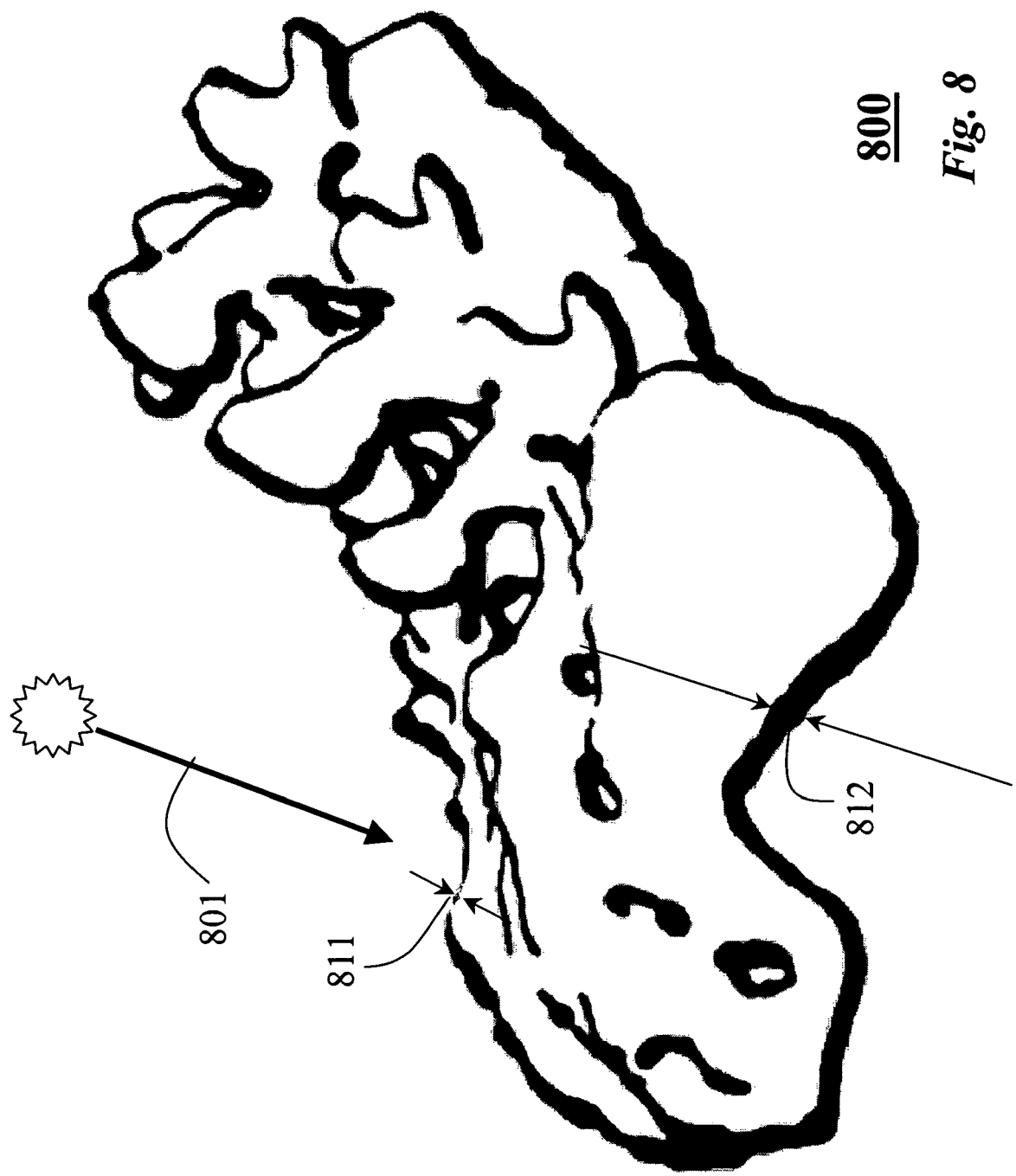
FIG. 8 is an output image with varying edge widths.

As shown in FIG. 8, we can convey an arbitrary light direction 801 in an output image 800 of the anatomical part, by modifying widths 811-812 of depth edges depending on an orientation of the depth edges with respect to the lighting direction. Because the edge orientation in 3D is approximately the same as the orientation of its projection in image plane, the width can be proportional to a dot product of an image space normal and the desired light direction.

Color Variation

Figure 9:
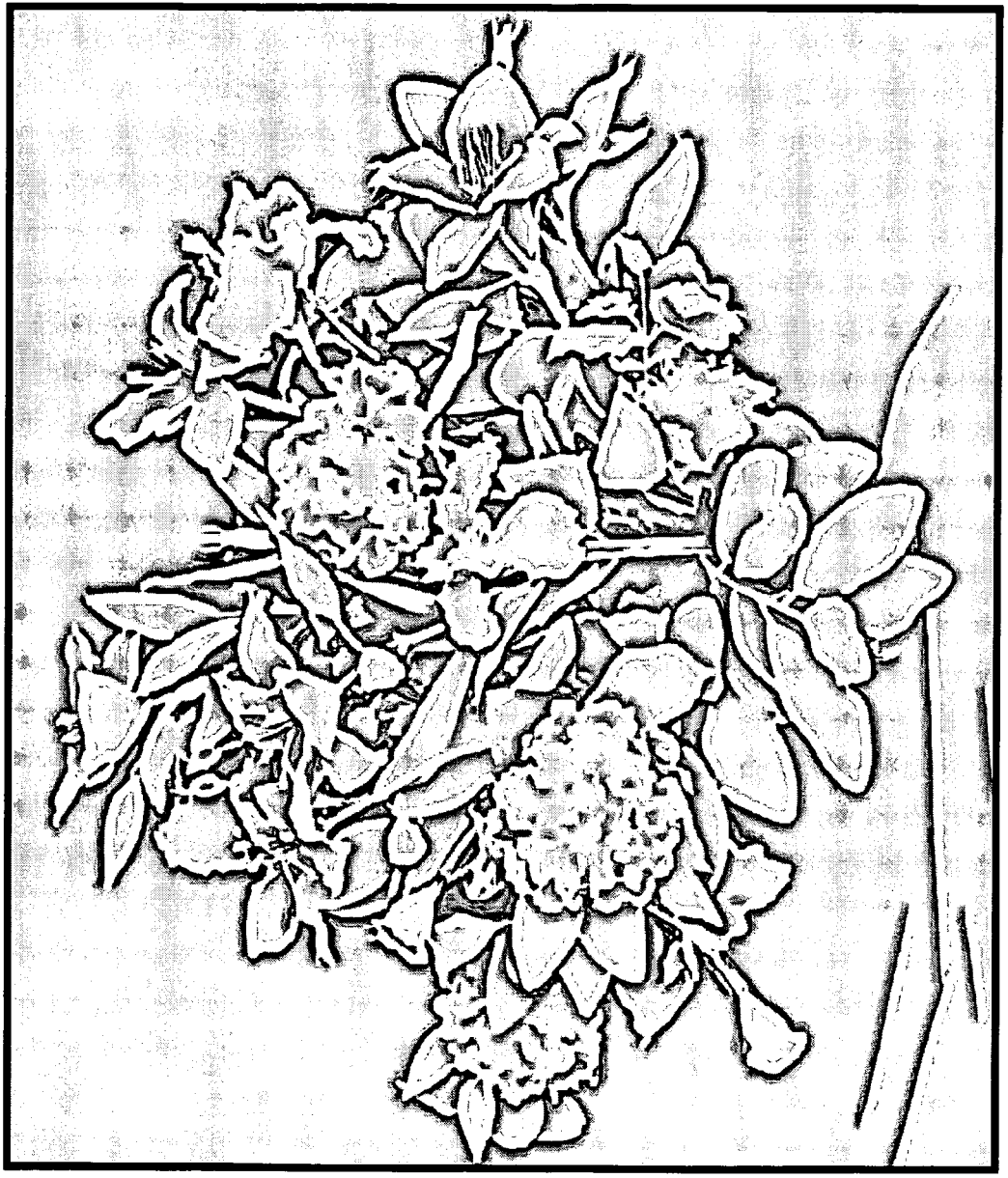
FIG. 9 is an output image with de-emphasized texture.

As shown in FIG. 9, we can indicate color of original object by rendering the depth edges in a selected color. From the signed depth edges, we select a foreground color along the normal at a fixed pixel distance, without crossing another depth or intensity edge. The foreground colored depth edges can also be superimposed onto a segmented input image, for example, the input image acquired with ambient lighting.

Color Assignment

Because there is no 3D model of the scene, rendering non-edge pixels requires different ways of processing captured 2D images.

Normal Interpolation

Figure 10B:
FIGS. 10A-10B are output images of smooth objects.
Figure 10A:
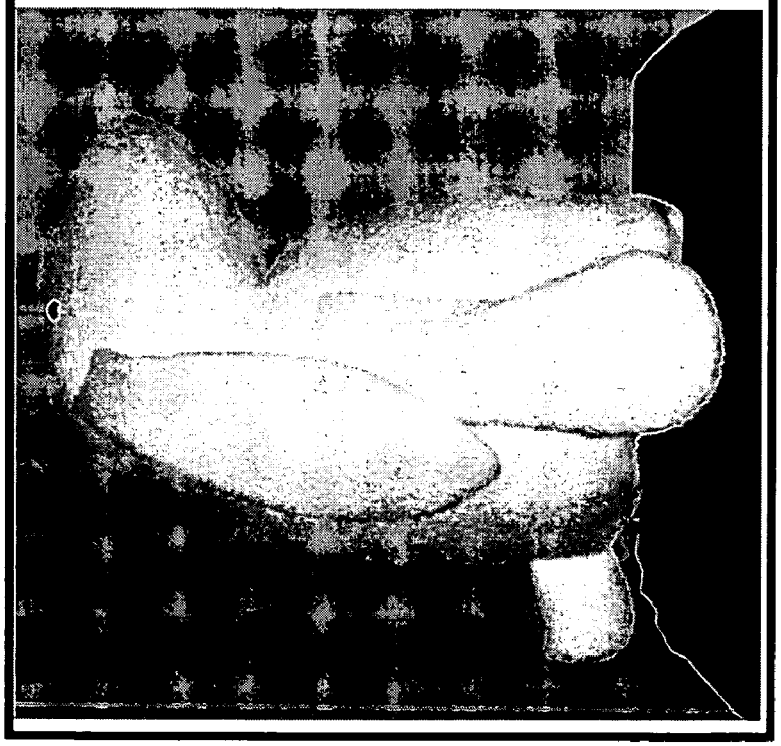

As shown in FIGS. 10A-10B for smooth objects, the depth edges correspond to the occluding contour where the surface normal is perpendicular to the viewing direction. Hence, the normals at depth edges lie in the plane of the image, and we can predict normals at other pixels. We solve this sparse interpolation problem by solving a 2D Poisson differential equation. Our method automates a manual method for generating over-under mattes as described by Johnston, "Lumo: illumination for cell animation," Proceedings of the second international symposium on. Non-photorealistic animation and rendering, ACM Press, PP. 45-52, 2002. In our case, signed depth edges allow normal interpolation while maintaining normal discontinuity at depth edges to enhance surfaces 1001 oriented away from the lighting direction.

Image Attenuation

Professional photographers sometimes use local lights to accentuate the contrast at shape boundaries. We mimic this with an image attenuation maps as follows. Depth edges are in white on a black background. We convolve with a filter that is the gradient of an edge enhancement filter. Our filter is a Gaussian function minus an impulse function. When we perform a 2D integration on the convolved image, we get a sharp transition at the depth edge.

Depicting Change

Figure 11:
FIG. 11 are output images of changing objects in a scene.

Some static illustrations demonstrate action e.g., changing oil in a car, by making moving parts in the foreground brighter. Foreground detection via intensity-based schemes, however, is difficult when the colors are similar and texture is lacking, e.g., detecting hand gesture in front of other skin colored parts, as shown in FIG. 11.

We acquire two separate sets of multi-flash images, a 'background' set 1101 without the hand, and a foreground set 1102 with the hand in front of the face to capture the reference and changed scene. Without explicitly detecting foreground, we highlight interiors of regions that contribute to new depth edges. We determine a gradient field where pixels that are marked as depth edges in the changed scene but not in reference are assigned a unit magnitude gradient. The orientation matches the image space normal to the depth edge. The gradient at other pixels is zero. The reconstructed image from 2D integration is a pseudo-depth map-least squared error solution via solving Poisson equation. We threshold this map at 1.0 to get a foreground mask 1103 which is used to brightened the corresponding portions of the output image 1104.

Note, the shadow width along the epipolar ray is proportional to the ratio of depth values on two sides of the edge. Hence, instead of a unit magnitude gradient, we assign a value proportional to the logarithm of the shadow width along the epipolar ray to get a higher quality pseudo-depth map.

Unfortunately, we found that the positive transition along the ray is not strong due to the use of a non-point light source and inter-reflections. In principle, estimated shadow widths could be used for say, tunable abstraction to eliminate edges with small depth difference.

Abstraction

One way to reduce visual clutter in an image and clarify object shape is to simplify details not associated with the shape boundaries, i.e., depth edges, of the scene, such as textures and illumination variations. Traditional image segmentation approaches place hard constraint on closed contours assigning a fixed color to each region. In addition, segmentation may miss the depth edge so that the foreground and background will be merged into a single color object.

Our method reconstructs image from gradients without those at texture pixels. No decision is made about what intensity values to use to fill in holes, and no feathering and blurring need be done, as is required with conventional pixel-based systems.

The mask image $\gamma(x, y)$
= $\alpha$ if (x, y) is a texture edge pixel;
d(x,y) if (x, y) is a factor; and
=1.0 if (x, y) is a depth edge pixel.

The factor d(x,y) is the ratio of distance field of texture pixel to the distance field of depth edge pixel. This, parameter a controls the degree of abstraction, and textures are suppressed for $\alpha=0$. The procedure is as follows.

Generate a mask i age $\gamma(x,y)$
Determine an intensity gradient $\nabla I(x,y)$
Modify masked gradients $G(x,y)=\nabla I(x,y)\gamma(x,y)$
Reconstruct image I' to minimize |I'−G|
Normalize colors in the output image I'(x,y) to substantially match the color in the input image I(x,y).

The image reconstruction follows the solution of a Poisson equation via a multi-grid approach as in the specularity attenuation technique described above.

Dynamic Scenes

Thus far, our method acquires multiple images of a static scene to determine geometric features. We examine the lack of simultaneity of capture for scenes with moving objects or a moving camera. Again, a large body of work exists for estimating motion in image sequences, and a sensible approach is to use the results from the static algorithm and apply motion compensation techniques to correct the artifacts introduced.

Finding optical flow and motion boundaries, however, is a challenging problem especially in textureless regions. As in the static case, we bypass the hard problem of finding the rich per-pixel motion representation and focus directly on finding the discontinuities i.e. depth edges in motion.

In this case, the camera is a video camera that acquires a sequence of sets of images (frames), with one flash per frame. The sequence of sets of images is then processed in their temporal order as described above.

We find depth edges in each frame and connect edges found in each frame into complete depth edges.

Depth Edges in Motion

Lack of simultaneity of acquisition means that the base image, such as the maximum composite, $I_{max}$, is unreliable and features are misaligned. This prevents us from finding shadow regions reliably. We make the simplifying assumption that the scene motion is moderate, specifically, in the image space, the motion of the objects features is smaller than width of objects. A high speed camera can reduce the amount of motion between frames but the lack of simultaneity cannot be assumed. Because of our novel way of illuminating, this turns out to be relatively easy to solve by observing moving shadowed regions. To simplify this description, we consider just the flash units to the left and right of the lens to determine vertical depth edges.

We identify three types of intensity gradients present in such sequences:

gradients due to depth edge, which have abutting shadow edges;
gradients due to texture edges of static parts; and
gradients due to texture edges of moving parts.

Using the basic method described above, which generates image ratios, we can trivially remove the static texture edges.

We exploit the fact that, due to the left-to-right switch in illumination, a shadow edge disappears in alternate frames while a moving texture edge does not.

The process for determining depth edges in frame m, given frame m−1 and frame m+1 is as follows, where a=frame $I_{m-1}$, b=frame $I_m$, c=frame $I_{m+1}$:

Determine a shadow preserving image $I_{ab}$, where $I_{ab}$=min (a,b,c)
Determine a shadow free image $I_{ac}$, where $I_{ac}$=min(a,c)
Determine a ratio image, $R_m$, where $R_m \cdot I_{ab}/I_{ac}$ Traverse along epipolar ray from $e_m$ and mark negative transitions.

The ratio $R_m$ is close to zero when a pixel in frame m is between corresponding pixels in frame m−1 and m+1. That is, the intensity in both those frames is higher. For a depth edge, static or moving, abutting shadow appearing in frame m causes this condition, but not for a texture step edge that is static or moving.

Edges and Colors

The depth edges in a given frame m are incomplete because they span only limited orientations. In a dynamic scene, a union of depth edges for four successive frames may not line up to discern discontinuous contours. We match signed depth edges corresponding to the same flash unit, i.e., m and m+n, and interpolate the displacement for intermediate frames. To assign colors, we take the maximum of three successive frames, e.g., the previous, current, and next frame.

Note that our depth edge extraction method can be used for spectrums other than visible light that generate 'shadows' in infrared, sonar, x-rays and radar imaging. Specifically, it is possible to equip the camera with infrared light sources that are invisible, so that the resulting flashes are not distracting.

In fact, one can use a frequency division multiplexing scheme to generate a single shot multi-flash system. The flashes simultaneously emit four different colors at different wavelength. A Bayer mosaic pattern of filters on the camera imager decodes the four separate wavelengths.

Applications of Depth Edges

Detecting depth discontinuity is fundamental to understanding images, and can be used in many applications. Although current methods rely primarily on outermost silhouettes of objects, we believe a complete depth edge map can benefit problems in visual hull, segmentation, resolving depth layers and aspect graphs. Aerial imaging techniques can improve building detection by looking at multiple time-lapsed images of cast shadows from known directions of sun light. In addition, effects such as depth of field effect during post-processing, synthetic aperture using camera array and screen matting for virtual sets with arbitrary background require high quality signed depth edges.

Edge-based or area-based stereo correspondence can be improved by matching signed depth edges, constraining dynamic programming to segments within depth edges and modifying correlation filters to deal with partial occlusions. Edge classification can also provide a confidence map to assist color and texture segmentation in low-contrast images.

EFFECT OF THE INVENTION

The invention provides a simple yet effective method to convey shape by rendering stylized images and stylized videos of real world scenes. We exploit the epipolar relationship between light sources and cast shadows to extract geometric features from multiple images of a scene. By making use of image space discontinuity rather than relying on 3D scene reconstruction, our method can robustly acquire underlying scene primitives for rendering in different styles.

The invention provides basic camera configuration, related feature extraction and rendering processes. Because depth edges are such a basic primitive in any image of a real world scene, we describe ways in which depth edge information can be used in applications beyond non-photorealistic rendering.

The invention uses a still or video camera with multiple flash units placed on the body of the camera around the lens. Instead of having to estimate the full 3D coordinates of points in the scene, and then look for depth discontinuities, the method according to the invention reduces the general 3D problem of depth edge recovery to one of intensity step edge detection.

Thus, imaging geometry image geometry can be exploited to render stylized images of real world scenes and objects simply and inexpensively. The invented camera solution can be a useful tool for professional artists and as well as casual photographers.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for generating a stylized image of a scene including an object, comprising the steps of:
    acquiring a set of n input images $I_k$, k=1 . . . n, of the scene with a camera, each one of the n input images being illuminated by one of a set of n light sources mounted on a body of the camera at different positions from a center of projection of a lens of the camera;
    determining for each of the n input images $I_k$ an intensity gradient $G_k(x,y)$ at each pixel position (x,y), a median of the n determined intensity gradients $G(x,y)=\text{median}_k(G_k(x, y))$ to remove outliers, and a reconstructed image I' that minimizes $|H'-G|$, wherein H' is the gradient image of I';
    removing specular highlights from the n input images;
    detecting features in the set of n input images, the features including silhouette edges;
    combining the set of n input images in which the detected silhouette edges are enhanced in an output image; and
    wherein the acquiring, determining, removing, detecting and combining steps are performed using a computer.

2. The method of claim 1, in which the silhouette edges correspond to a depth discontinuities in the n input images.

3. The method of claim 1, in which the silhouette edges are signed, wherein foreground pixels in the n input images have positive values, and background pixels have negative values, and the texture edges delineate reflectance and material discontinuities in the scene.

4. The method of claim 3, in which a foreground side of the silhouette edges have the positive values, and a background side of the silhouette edges have the negative values, and further comprising:
    rendering the foreground side as white; and
    rendering the background side as black.

5. The method of claim 4, further comprising:
    rendering the foreground side and the background side of the silhouette edges by displacing the contour along a surface normal.

6. The method of claim 5, further comprising:
    modifying a width of the silhouette edges to convey an arbitrary light direction in the output image.

7. The method of claim 6, in which the width is proportional to a dot product of an image space normal and the arbitrary light direction.

8. The method of claim 1, in which the silhouette edges correspond to shadow regions in the scene in terms of coordinates of an image space.

9. The method of claim 8, in which the object in the scene and the shadow regions are contiguous in the image space.

10. The method of claim 8, further comprising:
generating, for each of the n input image, a ratio image from pixel intensities in the shadow regions that are substantially close to zero;
performing intensity edge detection on each ratio image along epipolar rays marking negative step edges at the silhouette edges to generate a depth edge map for each ratio image; and
combining the edge maps from all n input images to obtain a final depth edge map.

11. The method of claim 1, in which the set of n light sources are mounted on the body of the camera mounted at different distances from the center of projection of a lens of the camera to provide a plurality of baselines.

12. The method of claim 1, in which a ratio $I_k(x,y)/I'(x,y)$ is set to 1.0 to remove the specular highlights if the ratio is greater than 1.0.

13. The method of claim 1, further comprising:
connecting the silhouette edge pixels into a contour; and smoothing the contour.

14. The method of claim 1, further comprising:
rendering the silhouette edges in a selected color.

15. The method of claim 14, in which one input image is illuminated by ambient lighting, and further comprising:
segmenting the one input image illuminated by ambient lighting; and superimposing the colored silhouette edges on the segmented input image.

16. The method of claim 1, further comprising:
rendering the silhouette edges in white on a black background in the output image;
convolving the silhouette edges with a filter that is gradient of an edge enhancement filter to obtain a convolved image; and
integrating the convolved image to obtain sharp transition at the silhouette edges.

17. The method of claim 16, in which the enhancement filter is a Gaussian function minus an impulse function.

18. The method of claim 1, in which the scene includes a background object and a foreground object, and further comprising:
acquiring a first set of n input images of the scene with only the background object;
acquiring a second set of n input images of the scene with the background object and the foreground object;
applying a mask to portions of the second set of n images corresponding to the foreground object to enhance an appearance of the foreground object in the output image.

19. The method of claim 18, in which pixel intensity values in the mask are set to one.

20. The method of claim 1, in which the texture edges define texture regions in the n images, and further comprising:
masking the texture regions according to a mask image to reduce clutter in the output image.

21. The method of claim 1, in which the camera is a video camera, and the object is moving in the scene, and further comprising:
acquiring a sequence of sets of n input images of the scene with the video camera;
detecting the features in the sequence of sets of n input images; and
combining each of the sequence of sets of n input images in which the detected silhouette edges are enhanced in an output image to obtain a sequence of output images.

22. The method of claim 21, further comprising:
identifying intensity gradients in the sequence of sets of images, the intensity gradients including gradients due to the silhouette edges, gradients due to the texture edges of static parts, and gradients due to texture edges of moving parts; and
removing the texture edges having static parts.

23. The method of claim 22, further comprising:
interpolating displacements of moving depth edges in the sequence of output images.

24. The method of 21, further comprising:
assigning colors of pixels in a particular image of the sequence of output images according to a maximum of three successive images.

25. The method of claim 24, in which the three successive images is the particular image, a previous image and a next image in the sequence.

26. The method of claim 1, in which the light sources emit visible light.

27. The method of claim 1, in which the light sources emit infrared light.

28. The method of claim 1, in which the light sources emit sonar signal.

29. The method of claim 1, in which the light sources emit x-rays.

30. The method of claim 1, in which the light sources emit radar signals.

31. The method of claim 1, in which the light sources simultaneously emit light at a plurality of wavelengths, and further comprising:
decoding the plurality of wavelengths at sensor in the camera using a plurality of filters.

32. The method of claim 31, in which the filters have Bayer mosaic patterns.

33. The method of claim 1, further comprising:
determining a visual hull from the edges.

34. The method of claim 1, further comprising:
segmenting the output image according to the edges.

35. The method of claim 1, further comprising:
resolving depth layers in the output image according to the edges.

36. The method of claim 1, further comprising:
resolving aspect graphs of the output image according to the edges.

37. The method of claim 1, in which the input images are acquired by aerial imaging photography.

38. The method of claim 1, in which the light sources are flash units.

* * * * *